United States Patent [19]

Bluthgen

[11] Patent Number: 5,587,979
[45] Date of Patent: Dec. 24, 1996

[54] INFORMATION CARRIER HAVING INFORMATION PACKETS CONTAINING CODED TEXT OR IMAGE INFORMATION RELATING TO DIFFERENT CATEGORIES, ARRANGEMENT FOR READING SUCH INFORMATION CARRIER AND A SYSTEM INCLUDING SUCH ARRANGEMENT AND INFORMATION CARRIER

[75] Inventor: Bjorn Bluthgen, Celle, Germany

[73] Assignees: U.S. Philips Corporation; Dupont Optical Company, both of Nieuwegein, Netherlands

[21] Appl. No.: 300,002

[22] Filed: Apr. 5, 1993

Related U.S. Application Data

[63] Continuation of Ser. No. 741,230, Aug. 5, 1991, abandoned, which is a continuation of Ser. No. 297,800, Jan. 17, 1989, abandoned.

[30] Foreign Application Priority Data

Jan. 19, 1988 [DE] Germany ........................... 38 01 332.0
May 18, 1988 [DE] Germany ........................... 38 16 832.4

[51] Int. Cl.$^6$ .................................................. G11B 7/085
[52] U.S. Cl. .............................. 369/32; 369/48; 369/50; 369/54; 369/58; 369/275.3
[58] Field of Search .................................. 360/14.1–14.3, 360/32, 33.1, 40, 48; 369/32, 44.28, 48–50, 54, 58, 124, 275.3; 358/335, 342, 183, 185; 371/69.1; 340/723; 348/578, 594, 600; 345/199

[56] References Cited

U.S. PATENT DOCUMENTS

| | | | |
|---|---|---|---|
| 4,541,093 | 9/1985 | Furuya et al. ........................ | 369/49 X |
| 4,697,176 | 9/1987 | Kawakami ............................... | 340/723 |
| 4,729,043 | 3/1988 | Worth .................................... | 360/33.1 X |
| 4,777,539 | 10/1988 | Nomura et al. ....................... | 360/14.3 X |
| 4,796,098 | 1/1989 | Giddings ............................... | 369/54 X |
| 4,821,254 | 4/1989 | Satoh et al. ............................ | 369/54 |
| 4,833,549 | 5/1989 | Yoshimoto et al. ................... | 360/191 |
| 4,843,484 | 6/1989 | Kanamaru ............................. | 369/54 X |
| 4,852,105 | 7/1989 | Kurz ...................................... | 371/69.1 |
| 4,860,272 | 8/1989 | Nishikawa et al. .................... | 369/48 |
| 4,914,527 | 4/1990 | Asai et al. ............................. | 360/32 X |
| 4,992,886 | 2/1991 | Klappert ................................ | 358/342 |

FOREIGN PATENT DOCUMENTS

| | | |
|---|---|---|
| 0274382 | 7/1988 | European Pat. Off. . |
| 2118351 | 10/1983 | United Kingdom . |
| 2145555 | 3/1985 | United Kingdom . |

*Primary Examiner*—W. R. Young
*Attorney, Agent, or Firm*—Richard A. Weiss

[57] ABSTRACT

A system for transferring audio and/or video information via an information carrier, e.g., DAT, CD or CDV. In the R-W subcode channels of a CD-signal, textual or visual information about the audio and/or video signal is recorded. This information is divided into packets. Packets containing information of different categories are interleaved. After reading the information from information carrier, the packets of a selected category are separated from information read. This system of transferring additional information (in packets) allows the use of a separate packet category for each of a number of different languages, so that a user can select a language with which he or she is most familiar. In addition, menu information, including coded menu text lines and command codes, can be recorded in the R-W subcode channels as packets for interactive control of the read-out of the audio and/or video information or the control of other connected devices.

82 Claims, 10 Drawing Sheets

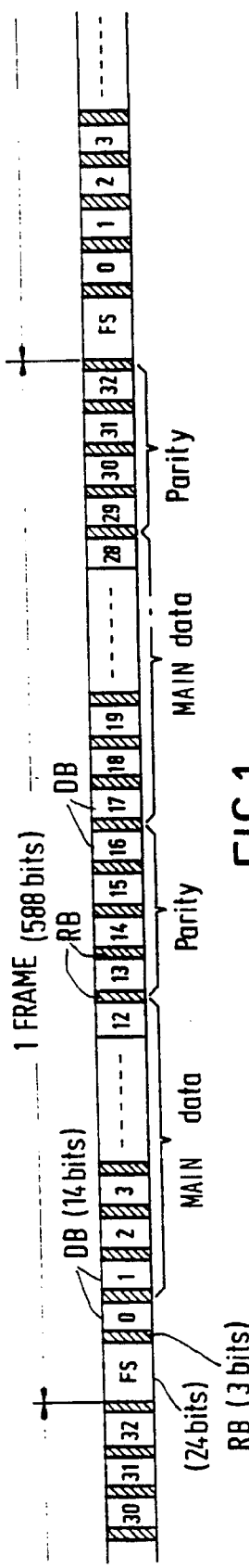
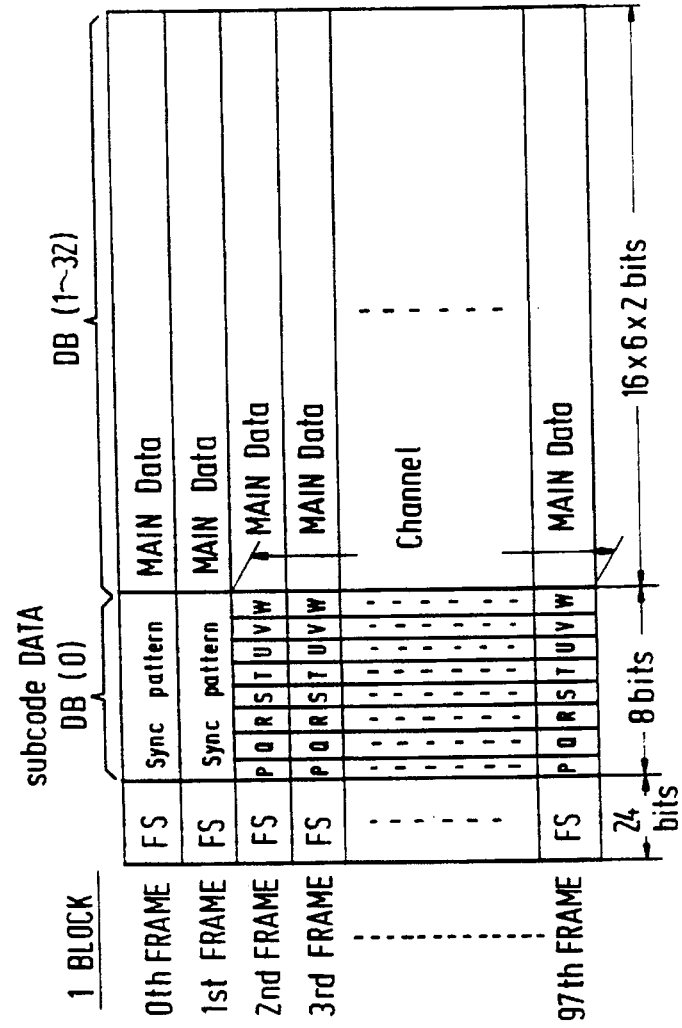
FIG. 1 PRIOR ART
FIG. 2 PRIOR ART

| symbol \ bits | \multicolumn{6}{c}{Pack 1} | | | | | |
|---|---|---|---|---|---|---|
| | 5 | 4 | 3 | 2 | 1 | 0 |
| 0 | \multicolumn{3}{c}{Mode 2} | \multicolumn{3}{c}{Item 0} | | | |
| 1 | MIC 5 | | | | | MIC 0 |
| 2<br>3 | \multicolumn{6}{c}{ECC} | | | | | |
| 4 | Sync 1 | | | | LCD 1 | LCD 0 |
| 5 | | | | | | |
| 6 | b0.1 – b0.0 | | Byte | b1.7–b1.4 | | |
| 7 | 3 | | | 4 | | |
| 8 | 6 | | | 7 | | |
| 9 | 9 | | | 10 | | |
| 10 | 12 | | | 13 | | |
| 11 | 15 | | | 16 | | |
| 12 | 18 | | | 19 | | |
| 13 | 21 | | | 22 | | |
| 14 | 24 | | | 25 | | |
| 15 | 27 | | | 28 | | |
| 16 | 30 | | | 31 | | |
| 17 | 33 | | | 34 | | |
| 18 | 36 | | | 37 | | |
| 19 | 39 | | | Index | | |
| 20<br>21<br>22<br>23 | \multicolumn{6}{c}{ECC} | | | | | |

FIG. 5B

INFORMATION CARRIER HAVING INFORMATION PACKETS CONTAINING CODED TEXT OR IMAGE INFORMATION RELATING TO DIFFERENT CATEGORIES, ARRANGEMENT FOR READING SUCH INFORMATION CARRIER AND A SYSTEM INCLUDING SUCH ARRANGEMENT AND INFORMATION CARRIER

This is a continuation of application Ser. No. 07/741,230, filed on Aug. 5, 1991, which is a continuation of application Ser. No. 07/297,800, filed Jan. 17, 1989, both now abandoned.

BACKGROUND OF THE INVENTION

The invention relates to a system for transferring information using an information carrier on which main information and sub-information have been recorded, predetermined bits of the sub-information forming a sub-information channel. In accordance with that system, after reading the information, the bits of the sub-information channel are separated. The invention further relates to an information carrier and an arrangement for use in the system. Such a system, information carrier and arrangement are known from the United Kingdom Patent Application No. GB 2118351.

In this document a CD player is shown for playing a CD-audio disc in which in the R-W channels of the subcode channel additional textual information has been recorded which can be displayed on a displaying device. This additional information can comprise the title of a music piece reproduced, the text of a song reproduced, the name of the artist, etc.

SUMMARY OF THE INVENTION

The object of the invention is to provide a system as described in the opening paragraph which enables an improved communication with a user of a device for playing the information recorded on the information carrier. According to the invention, this object is achieved by a system characterized in that in the sub-information channel, packets of different information categories are recorded and interleaved, and an information category is selected and the packets of the selected information category are separated from the bits read from the information carrier.

The use of different packets for different information categories allows that for each of a number of different languages a different respective packet category can be used, so that the user can select the language of the textual information to be displayed by selecting the appropriate category. Since the packets are interleaved, the average delay time after which the information of the selected information category is available is small. In particular, when the information is transferred via the R-W channels of the subcode channel of a CD-audio signal, the delay time will be very small, due to the high number (75) of packets per second transferred. This high data rate has the advantage that the same information can be repeated a number of times without perceptibly increasing the delay time, so that the reliability of the transfer can be improved without any noticeable disadvantage.

An embodiment o the system is characterized in that each of the packets comprise a main category code, of the type described above (e.g., a language category code), and a sub-category code, the sub-category code indicating a sub-category to which the information of the respective packet belongs. Combinations of a main category code and a sub-category code are detected in each of the packets, and packets which have a combination of a main and sub-category code corresponding to the selected main and sub-category are separated. The use of a sub-category has the advantages that it allows different types of information to be transferred via packets of different sub-category types. In doing so, a simple selection from different types of information, such as title of song, name of the artist, etc., can be made by the user.

Another embodiment of the system is characterized in that a predetermined main category code defines an override function overriding previously selected main category selections. The use of a main category code overriding previously selected main category selections has the advantage that for the transfer of language independent information only one main category needs to be used for that purpose, in this case, the main category indicated by the predetermined (override) main category.

A further embodiment of the system is characterized in that a predetermined sub-category code defines an override function overriding previously selected sub-category selections. This embodiment has the advantage that it allows the transfer of important messages, irrespective of the sub-category selected.

Another embodiment of the system is characterized in that the packets comprise coded text lines and additional control codes. This embodiment has the advantage that the read-out of the information can be controlled simply by information recorded in the packets. A very useful control code is a text position code, indicating the position at which a coded text line transferred via the separated packets is to be displayed on the displaying device.

A further embodiment of the system is character in that the control codes in the packets comprising coded text lines comprise text position codes for at least two displaying devices of which the number of lines that can be displayed is different. The use of two different text position codes which are assigned to the same coded text lines allows the use of different displaying devices without the requirement that for the same information a coded text line is to be transferred for each displaying device.

The system, e.g., allows the display of the same text on a 21-line display such a CRT-display and on a 2-line LCD-display. In the case in which a CDV-player is used, the text can be displayed on a television screen which is used normally in combination with the CDV-player. The same text can also be displayed on the 2-line display comprised by a CD-player or CDV-player when no television apparatus is available.

Besides codes for controlling the display of coded text or image information being transferred, command codes for controlling the player and other peripherals can be transferred via the packets separated as well. Very useful command codes are codes for initiating a jump of the read-out to another part of a track of the information carrier and a command for switching on and off the display used to display the textual information transferred via the packets.

A further embodiment of the system is characterized in that pluralities of packets of the same information category form groups, the beginning of each group being indicated by a start code, and after a change of a selected category, the separating of packets pertaining to the newly selected category is postponed until the detecting of a start code of the group to which those packets belong. This allows an integral group of coded text lines to always be presented in sequence from a defined screen position onwards, e.g., from top to bottom.

Another embodiment of the system is characterized in that coded text lines of a menu and corresponding command codes are recorded in the packets, the text lines and corresponding command codes of the separated packets are loaded in a menu memory, the text lines of the menu stored in the menu memory are displayed, a text line of the menu displayed is selected, and the command code stored in the memory and corresponding with the selected text line of the menu is supplied as a control code to one of the devices. This embodiment has the advantage that in simple way an interactive control of the playing arrangement can be realized.

A further embodiment of the system is characterized in that the packets comprise an index code indicating the memory location (address) where the coded text lines of the menu and the corresponding command codes are to be stored in the menu memory. This embodiment has the advantage that storing the menu information in the memory is simple, since the menu organization is completely transferred together with the other information.

A further embodiment of the invention is characterized in that the information carrier is a CD or a CDV-disc with a table of contents recorded in a lead-in track preceding the main information tracks in which the main information is recorded, and in the lead-in track, a Jump Command is recorded in the R-W channels in combination with function control codes.

BRIEF DESCRIPTION OF THE DRAWINGS

The invention will now be described in more detail, by way of example, with reference to the accompanying drawings, in which:

FIGS. 1 and 2 show the data structure of a standardized CD-signal;

FIGS. 5A–5D and 6A–6D show an embodiment of the data format of packets for use in the system according to the invention;

DETAILED DESCRIPTION OF PREFERRED EMBODIMENTS OF THE INVENTION

Figure 3:
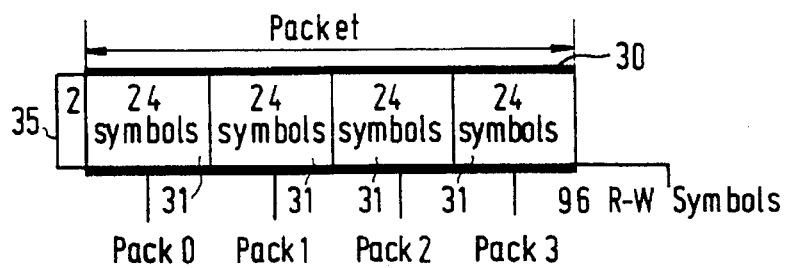
FIG. 3 shows an information packet formed by the R-W subcode signal bits of one block of the standardized CD-signal.

FIG. 1 shows the digital data stream recorded on a compact disc or in the audio channel of a CDV-disc. One FRAME is made up of 588 bits of record data. Each FRAME has at its head a frame sync pulse FS of a specific bit pattern. The frame sync pulse FS is followed by 3-bits, DC-restriction bits RB. Thereafter, 32 data bits DBs, each having fourteen bits, and 3-bit DC-restriction bits RB are further recorded alternatively. The 0th bits among these data bits DBs are called the subcode channel, and used to control the playback of a disc and to display related information or the like. The 1st–12th and 17th–28th data bits DBs are assigned for audio data in the main channel. The remaining 13th–16th and 29th–32nd data bits DBs are assigned for parity data of the error correction code in the main channel. Each of the data bits DBs is made up of 14 bits into which 8-bit data has been converted by 8–14 conversion upon recording.

FIG. 2 shows a BLOCK (98 FRAMEs), i.e., 98 FRAMEs arranged sequentially in parallel, wherein each of the data bits DBs is represented by 8 bits and the DC-restriction bits are excluded.

The bits in channels P-W of the subcode channel in the 0th and 1st FRAMEs form the synch patterns, which are predetermined bit patterns. The CRC-codes for error detection are inserted in the Q-channel of the subcode channel in the latter 16-FRAMEs of bits of the 98 FRAMES.

The bits of the P-channel are a flag to indicate a music program and a pause. Those bits have a lower level through the duration of a music program and a higher level throughout the duration of a pause, and the signal which is formed from them has pulses of 2-Hz period in the lead-out section. It is possible to select and playback the specified music program by detecting and counting this signal (of the P-channel). The Q-channel enables more complicated control of this type. For example, when the Q-channel information is stored in a microcomputer equipped in a disc playback apparatus, it is possible to jump quickly from one music program to another during the playback of a music program; thus, respective ones of the recorded music programs may be selected at random.

According to the invention, the other R to W channels are used for transferring textual information and commands for interactively controlling the read-out of the information recorded. The format in which this data is transferred will be described herein in detail later.

Among the 98 bits in the Q-channel, the first two bits are used for a sync pattern; the next four bits are used as control bits; the following 72 bits are used as data bits; and the last bits are used as a CRC-code for error detection. A track number code TNR and an index code X are included in the 72 data bits in the Q-channel. The track number code TNR can be varied from 00 to 99, and the index code X can be likewise changed from 00 to 99. Furthermore, the 72 data bits in the Q-channel contain a time indication code representative of the time durations of music programs and pauses, and a time indication code indicative of an absolute time duration that continuously changes from the beginning to the end on the most outer rim side in the program area of the compact disc. These time indication codes comprise a code indicating minute, second and FRAME, each consisting of two digits. One second is divided into 75 FRAMEs. In order to access the compact disc, such as a digital data, on a shorter unit basis than the music, the time indication code indicative of the absolute time duration is used.

The bits of the R-W channels of each BLOCK comprise a packet of 96 symbols of six bits each. In FIG. 3, such a packet is indicated by reference number 30. The packet 30 is divided into 4 packs 31 of 24 symbols each. To each packet 30 a main category code and a sub-category code is assigned indicating the category to which the information of the packet belongs. Packets of different categories are interleaved. The information recorded in the packets may be textual or image information to be displayed on a display device or command codes for controlling the read-out of the information.

Figure 4:
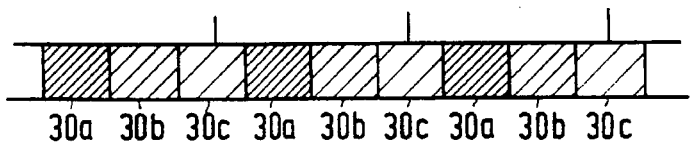
FIG. 4 shows a sequence of a number of interleaved packets of different information categories.
Figure 5A:
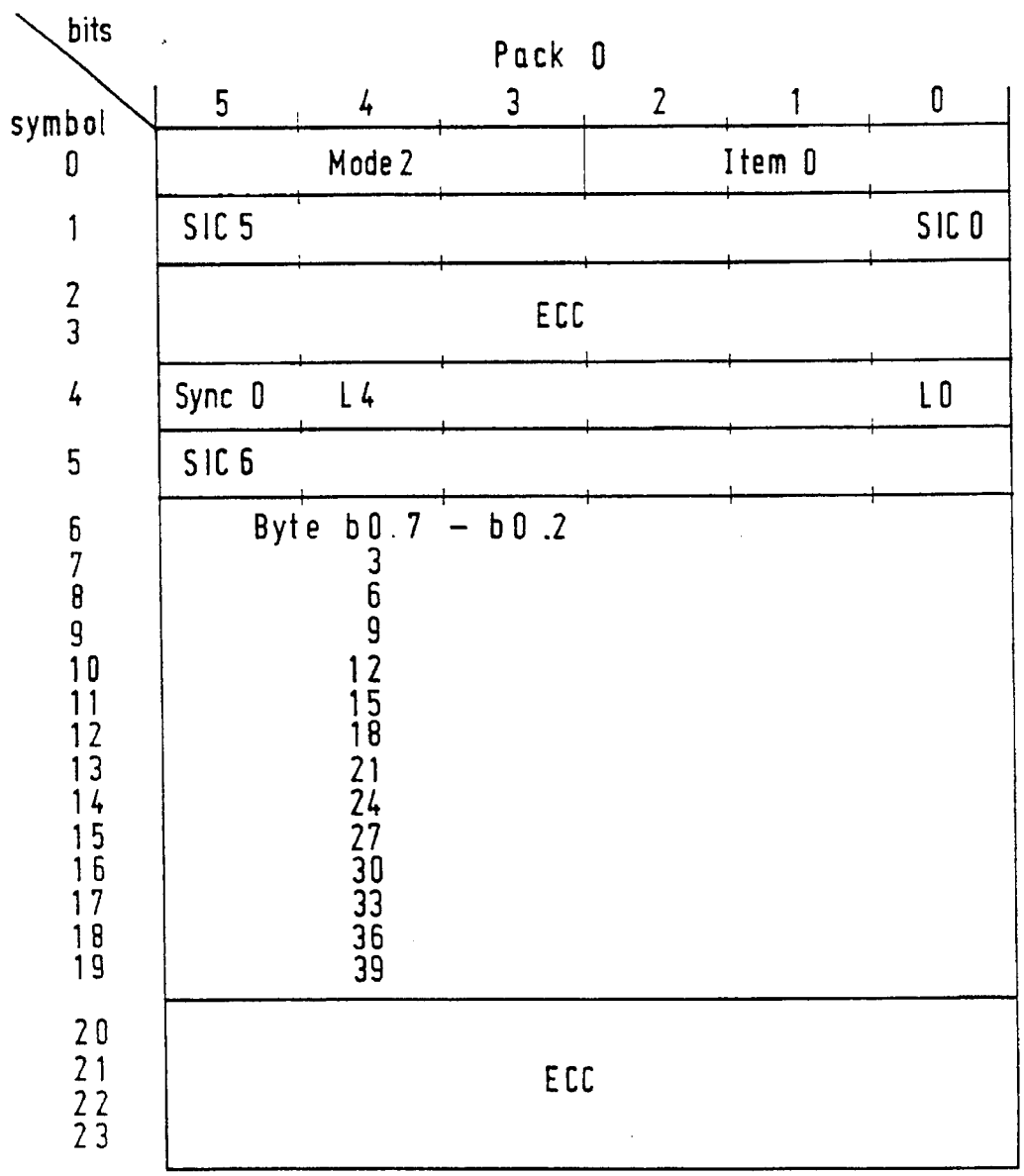
Figure 5C:
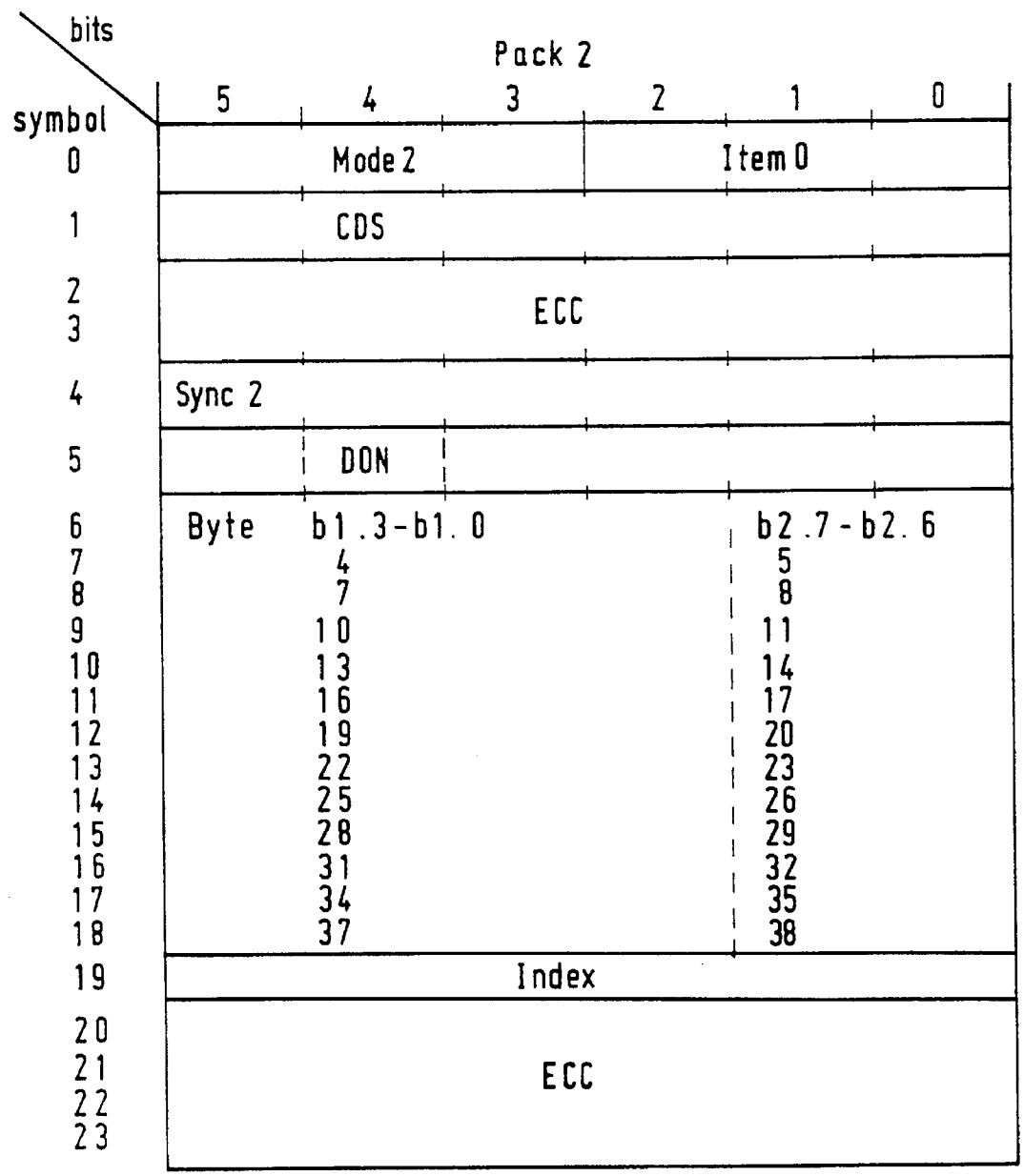
Figure 5D:
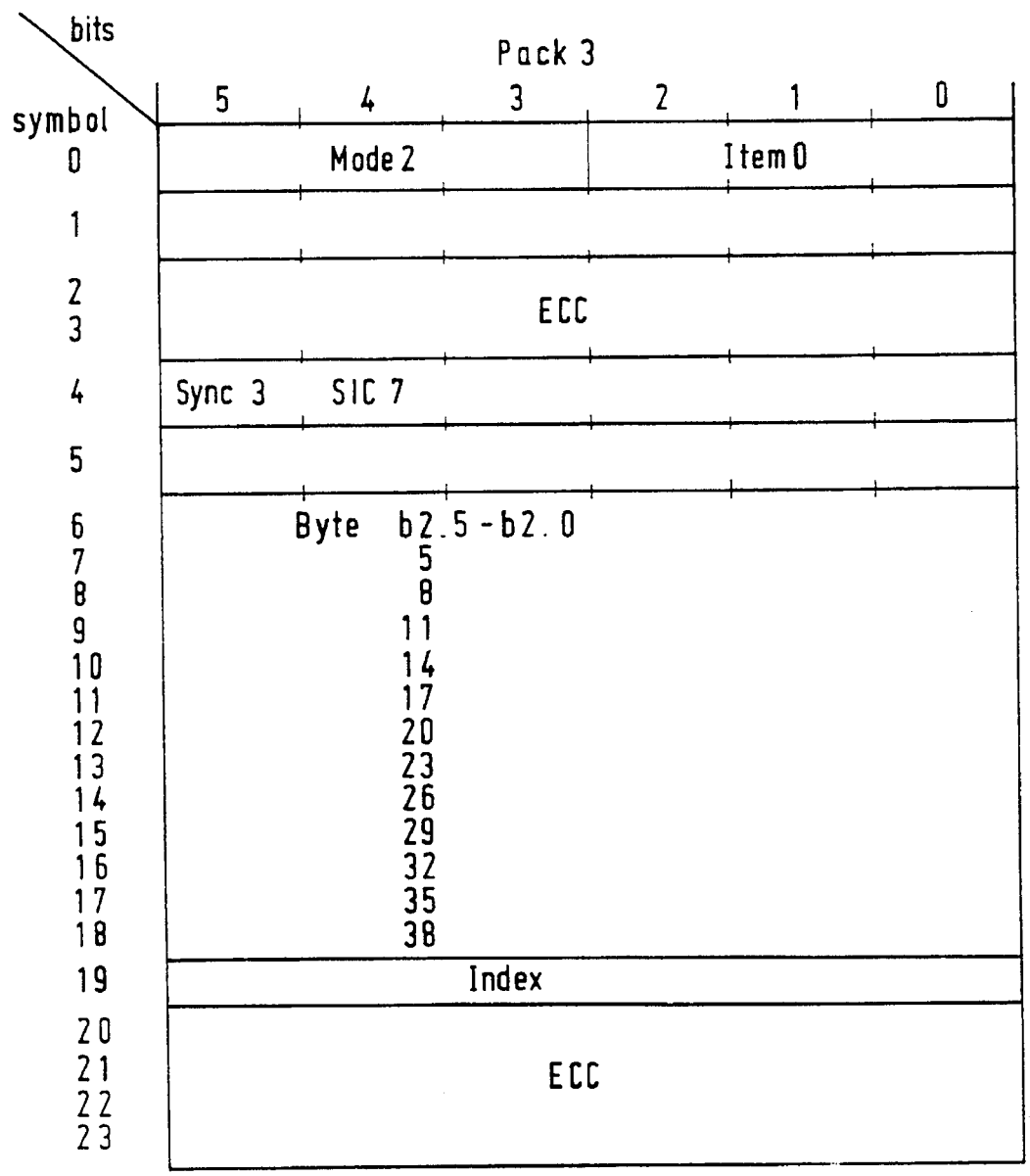
Figure 6A:
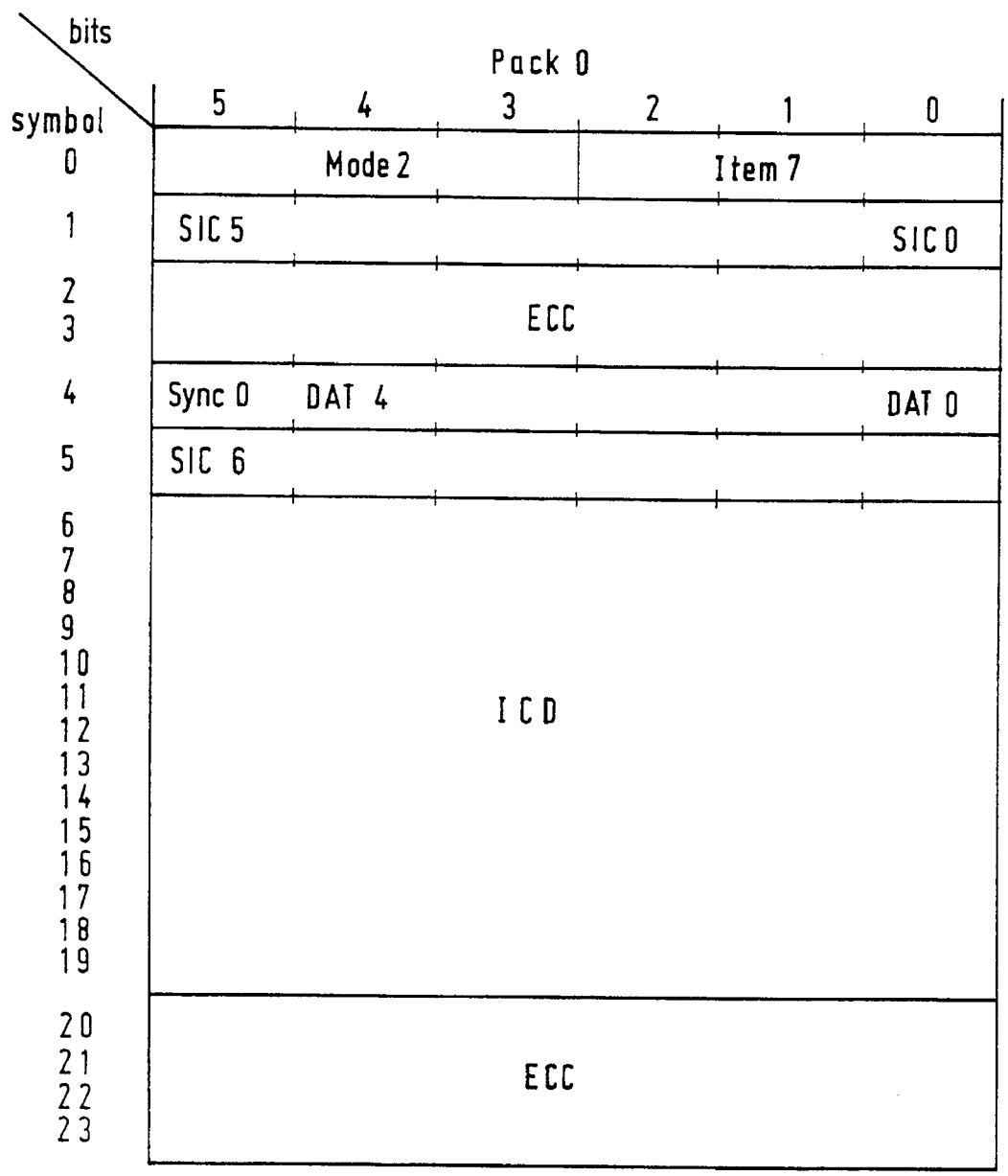
Figure 6B:
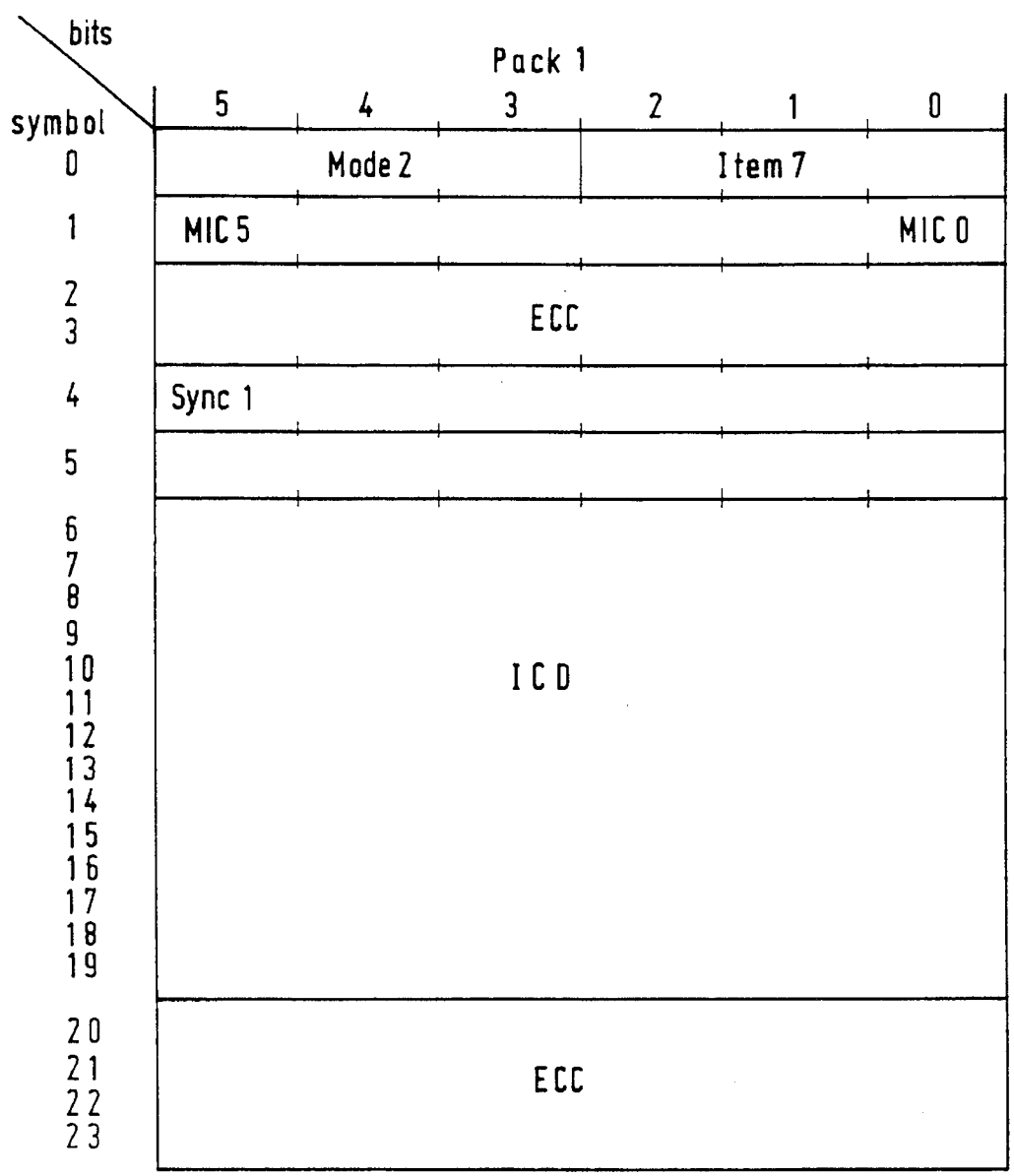
Figure 6C:
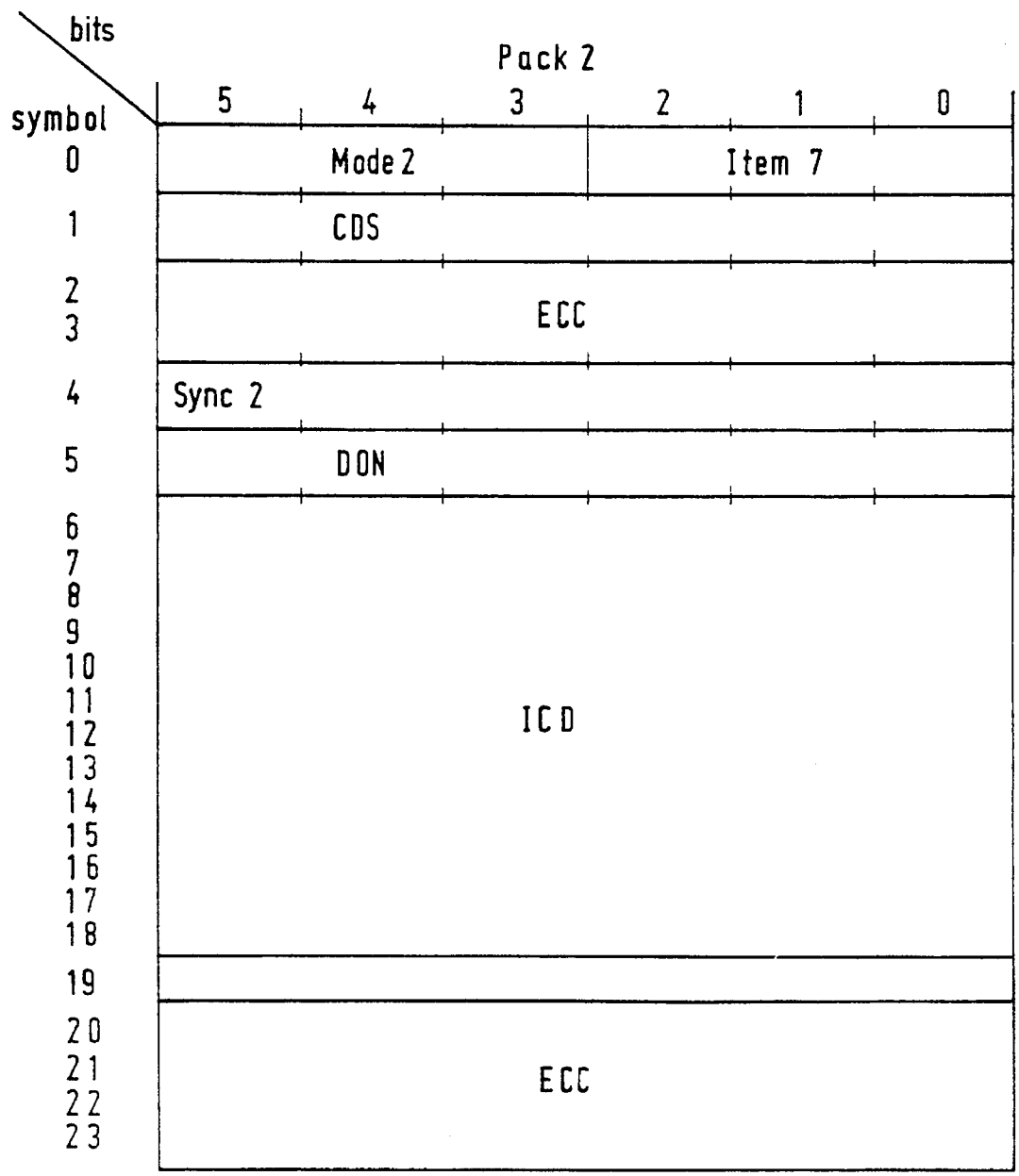
Figure 6D:
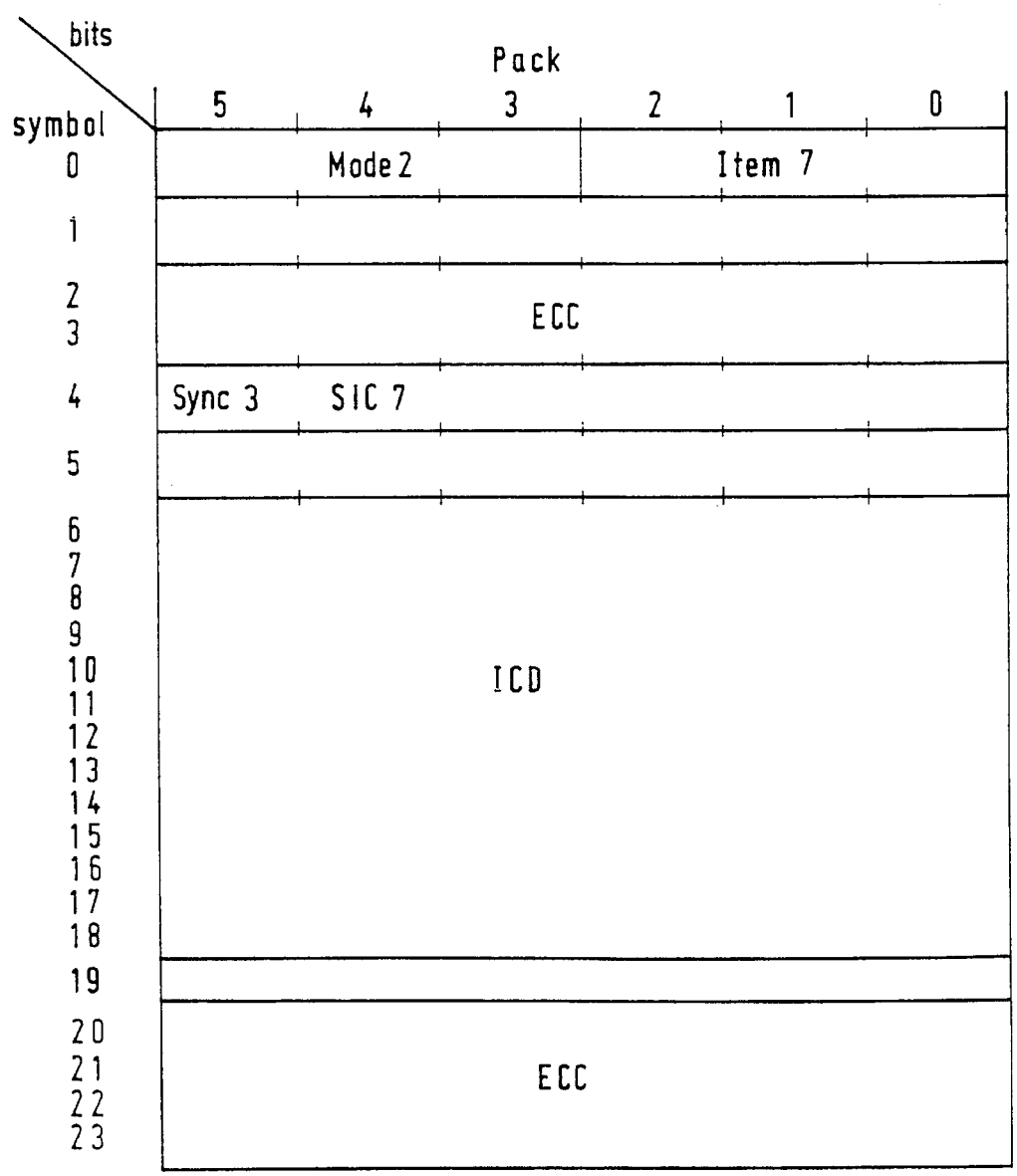

FIG. 4 shows a sequence of interleaved packets of different categories. The packets of the different categories are indicated with the reference signs 30a, 30b and 30c, respectively. The packets having the same main category code form a category channel. The packets having the same sub-category code within a main category channel form a sub-category channel.

A use for a main category channel could be a choice of language of the textual information to be displayed. A use of a sub-category channel could be the choice of sub-categories such as the album, track title, track list, artist etc. The use of channels of different categories enables the selection of the language and the sub-category to be displayed on a display during the playing of the disc.

FIG. 5A–5D show formats of the packs 0, 1, 2 and 3, respectively, suitable for transferring a line of coded text. Symbol 0 of each pack is used to indicate the type of the format. The format shown, indicated by mode 2 item 0, is used for transferring a coded text line of 40 text items. The bits of symbol 1 and bit 5 of symbol 5 of pack 0 and bit 4 of symbol 4 of pack 3 are used to transfer eight bits (SIC7–SIC0) indicating the sub-category. The bits (MIC5–MIC0) of symbol 1 of packet 1 are used to indicate the main category. In doing so, 64 different main categories and 256 different sub-categories can be selected. The bit 5 of symbol 4 of each pack is used for packet synchronization. The symbols 2, 3 and 20–33 of each pack are used for error checking and error correction. The symbols 6–19 of pack 0, symbols 6–18 and bits 5 and 4 of symbol 19 of pack 1, symbols 6–18 of pack 2 and symbol 6–18 of pack 3 are used to transfer 40 bytes each indicating a coded text item, e.g., an alphanumerical character. The bits 4–0 (L4–L0) of symbol 4 of pack 0 constitute a first text position code indicating the vertical position on which the coded text line transferred is to be displayed on a display with a first displaying capacity, e.g., a CRT-display with a displaying capacity of 21 text lines. The bits LCD1 and LCD0 in symbol 4 of pack 1 constitute a second text position code indicating the vertical position on which the coded text line is to be displayed on a display with a second displaying capacity, e.g., a 2-line LCD or LED-display.

The use of two different text position codes assigned to the same coded text line allows the use of two different display types, e.g., a 21-line display and 2-line display. A 21-line display in the form of a television screen will be normally available when video information is transferred via a CDV-disc. However, in the case that no 21-line display is available, the information, or parts thereof, can be displayed on the 2-line display. It is also possible to display different information on the two different displays, e.g., the 2-line display can be used for displaying textual information for indicating the function of so-called soft-keys, while the 21-line display can be used for displaying other textual information. When the two different displays are used in this way, it can be indicated by the text position line codes L4–L0=00000 and LCD1,LCD0=00 that the coded text line of the packet is not to be displayed on the 21-line display or the 2-line display respectively.

The bits 3–0 of symbol 19 of pack 1, symbol 19 of pack 2 and symbol 19 of pack 3 are used for transferring a two bytes index code for indicating a storing position in a menu memory. The function of the index code will be discussed further later herein. Bit 4 of symbol 5 of pack 2 indicates whether a displaying unit is to be switched on or off. The other bits of the packs 0–3 are used for further data for controlling the display of the coded text line, e.g., defining a color, defining a scroll area, defining a display mode for text only, text combined with background video, etc.

FIGS. 6A–6D show an example of a format which is suitable for transferring command codes. The bits used for the indication of the main category and sub-category, the error checking and correction, the synchronization and switching on and off a displaying unit are the same as in the format shown in FIGS. 5A–5D. The symbols 0 bits 0–2 used for item code of the pack 0–3 are used to indicate the type of format used. By means of a 4-bit code DAT4-DAT0 in bits 4–0 of symbol 4 of pack 0, it can be indicated that the packet comprises command codes. The bits used for transferring the command codes are the same as used for transferring the coded text items in the format shown in FIGS. 5A–5D. For each command code, a group of 7 bytes is transferred, two bytes being used for the two byte index code for indicating the storing position in a menu memory, and the other five bytes being used for specifying the command.

The use of packets for transferring coded text and command codes enables interactive control of a playback apparatus using menu information transferred to the playback apparatus via the packets recorded in the R-W channels of the subcode channel.

Figure 7:
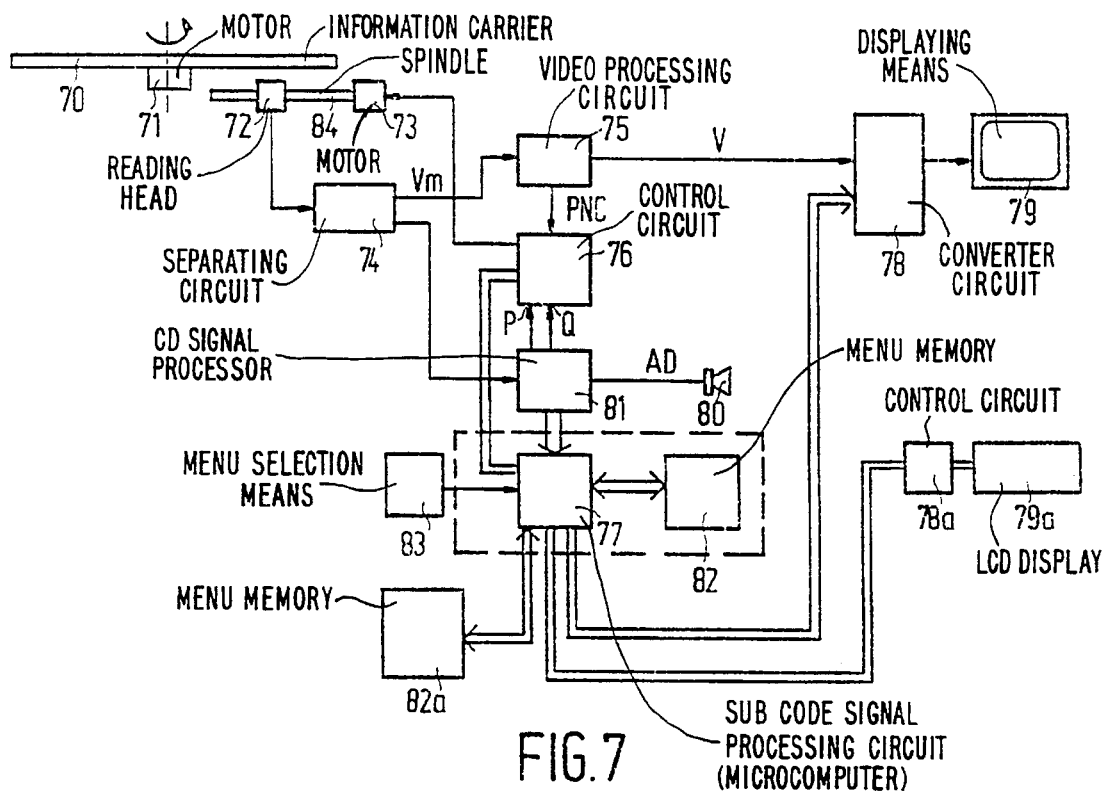
FIG. 7 shows an embodiment of the arrangement for use in the system according the invention.

FIG. 7 shows an arrangement according to the invention for retrieving information recorded on an information carrier. The arrangement of FIG. 7 is provided with a display for displaying textual information recorded (in coded form) in the packets and is further provided with a unit for interactively controlling read-out using menu information recorded in the packets.

In FIG. 7, an information carrier is indicated by reference 70. On the information carrier 70, a CD-signal is recorded, in which the bits of the R to W channels of the subcode channel are recorded in the formats as described hereinbefore. The information carrier 70 may be a CDV-disc on which an FM-modulated video signal and the CD-signal have been recorded.

The (disc-shaped) information carrier 70 of FIG. 7 is rotated by a driving motor 71. By means of a reading head 72, the information recorded is read from the information carrier 70. The reading head 72 can be moved in radial direction by a radial positioning system, e.g., a motor 73 and a spindle 84, under control of a usual control circuit 76 for searching addressed information on the information carrier 70. The signal read is supplied to a circuit 74 which separates the CD-signal and the FM-modulated video signal.

The FM-modulated video signal Vm is supplied to a video processing circuit 75, including a FM-demodulator for demodulating the FM-modulated signal into a video signal V, e.g., a PAL or NTSC signal. The video processing circuit 75 further includes a unit for separating picture number codes PNC transferred together with the video information. The picture number codes PNC are supplied to the control circuit 76.

The CD-signal is supplied to a CD-signal processor 81 for converting the CD-signal into an audio signal AD and separating the P-W subcode signals formed from the bits included in the P-W channels of the subcode channel, respectively. The subcode signals R-W are supplied to a subcode signal processing circuit, which may be made up of a microcomputer 77 of a known type. The microcomputer 77 is loaded with a program for detecting whether the packets received have the format as described in FIGS. 5A–5d and 6A–6D by means of the symbols 0 of the packs. Further, the main and sub-category cods in the packets are read and compared with codes representing the selected main and sub-category codes. The packets for which the detected category code corresponds with the selected categories are separated and validated. The coded text items and the display control signals of the separated packets are supplied to a converter circuit 78 of usual type for converting the coded text items into video signals for displaying a text line on a line position on the display screen as indicated by the text position codes comprised by the control signals. The video signal generated by the video processing circuit 75 is also supplied to the converting circuit 78.

Dependent on the control signals received from the microcomputer 77, the converting circuit 78 will cause:

(a) a combined display of the video information represented by the video signal and the text information represented by the coded text items received;

(b) a display of only the video information; or (c) a display of only the text information.

As described before, packets of different main categories may preferably be used for transferring text information of different languages. The packets of different sub-categories may be used for different types of information, e.g., sub menus, album, track and index title, track title list or the text of lyrics. As a result, a user can choose the type of text information to be displayed, and the language in which the text information is to be displayed.

Preferably one main category code is reserved for indicating an override main category and one sub-category code is reserved for indicating an override sub-category. The information in packets with the override main category code and the override sub-category code are always supplied to the converting circuit 78 by the microcomputer 77 by means of bypassing the current selection of the main and sub-category. The information in the packets with the override main category code and a sub-category code which is not the override sub-category code is only supplied to the converting circuit 78 if the sub-category code corresponds with the selected sub-category. The information in the packets with a main category code which is not the override main category and the override sub-category code is only supplied to the converting circuit 78 if the main category code corresponds with the selected main information category. The use of the override information categories is advantageous in the case that language independent text information is to be displayed. In that case, it is suffices to record the language independent information only in the override main category channel. The use of the override categories is also advantageous in the case that important messages are to be displayed.

In the case that a number of coded text lines is to be displayed as an integral group of information, it is advantageous to use a predetermined bit in the packet indicating the first packet of the group. In the format shown in FIGS. 5A–5D and 6A–6D, this is the bit CDS (bit 4 in symbol 1 of packet 2). After changing a selected category, the start of supplying information of the packets of a newly selected category is postponed until the CDS bit indicating the beginning of groups of packets is detected. This allows a group of coded text lines to always be present in sequence with a start from a defined screen position onwards, e.g. top and bottom.

In FIG. 7 microcomputer 77 is coupled to a menu memory 82, in which the codes for coded text lines forming a menu for interactive control are stored (such coded text lines hereafter being referred to as "menu text lines"). To each menu text line a command code has to be assigned which is also stored in the menu memory 82. The microcomputer 77 is loaded with a program for supplying the menu text lines to the converter circuit 78, so as to cause the menu to be displayed on the displaying unit 79. The microcomputer 77 is also coupled to menu selection unit 83, for selecting a menu text line displayed. Menu selection unit 83 may comprise cursor control keys for moving a cursor displaying on the screen of the displaying unit 79, a section key for selecting the menu text line indicated by the cursor. When the suer selects the menu text line indicated, the corresponding command code is executed.

Table 1 shows an example how the menu information may be stored in the menu memory 82.

TABLE I

| Index Address (Hex) | Packet data 4 Packs of 24 Symbols | Interactive Controls (Hex) |
|---|---|---|
| menu 1 | | |
| 0001 | text line 2 | 21 00 01 00 00 set main category channel 1 |
| 0002 | text line 4 | 21 00 02 00 00 set main category channel 2 |
| 0003 | text line 6 | 21 00 07 04 00 set main category channel 7 & sub-category channel 4 |
| 0004 | text line 10 | 22 00 00 00 00 set display on |
| 0005 | text line 12 | 22 00 00 00 01 set display off |
| 0006 | text line 16 | 20 00 80 02 00 go to menu at 0080 cursor at row 2 |
| * | * | * * |
| menu 2 | | |
| 0080 | text line 1 | 00 05 12 00 02 go to A-Time 5 min., 12 se., frame 0, track 2 |
| 0081 | text line 2 | 40 05 23 01 01 go to picture index 523 cursor row 01 column 01 |
| 0082 | text line 3 | 21 00 02 03 00 set main category channel 2 & sub-category channel 3 |
| 0083 | text line 10 | 20 00 01 00 00 go to menu at 0001 |
| * | * | * * |
| menu 3 | | |
| 0100 | text line 1 | 00 00 01 03 00 go to A-Time |
| 0101 | text line 2 | 00 00 02 00 00 go to A-Time |
| 0102 | text line 3 | 00 00 02 05 00 go to A-Time |
| 0103 | text line 4 | 40 03 01 21 40 go to image index 301 cursor row 21 column 40 |
| * | * | * * |
| menu 4 | | |
| 0123 | text line 31 | 20 00 80 00 00 go to menu memory at 0080 |
| 0124 | text line 31 | 20 01 00 00 00 go to menu memory at 0100 |
| 0125 | text line 31 | 22 00 00 00 01 set display off |

The first column at the left of Table I indicates the index address of the memory location in which a combination of a menu text line and a command code are stored. The command codes, comprising five bytes, are indicated in the third column. The function to be executed is indicated in the fourth column.

In Table I the menu information for four different menus are stored: a menu on index addresses 001–006, a menu on index addresses 080–83, a menu on index addresses 0100–0103 and a menu on index addresses 0123–0125.

Four different types of commands are to be distinguished in Table I:

(a) A first type (the JUMP COMMAND) for initiating a search of information recorded on a location on the information carrier indicated by an address comprised by the command code. This address may be the absolute time code recorded in the Q-channel or the picture number stored together with video information. When the text line corresponding with this type of command is selected, the microcomputer 77 will initiate a search function via the control circuit 76. The control circuit 76 is of usual type which can control the search of the location indicated by the address code. Command codes of this first type are stored in memory locations indicated by, e.g., index addresses 0080 and 0081.

(b) A second type for causing a display of another menu indicated by the index address comprised by the command codes. Command codes of this type are stored, e.g., in the memory locations indicated by index addresses 0006 and 0083.

(c) A third type for selecting a main and/or sub-category of the packets to be separated from the packet stream received by the microcomputer 77. Command codes of this type are stored in the memory locations, e.g., indicated by the index addresses 001 and 0082.

(d) A fourth type for turning the displaying unit 78 on and off for displaying the coded text lines supplied by the microcomputer 77 to the converter circuit 78. Command codes of this type are stored in the memory locations indicated by, e.g., the index addresses 004 and 0125. The microcomputer 77 is also loaded with a program for turning on the displaying unit 79 in response to the pressing of a predetermined key. In doing so, the pressing of that key is detected by the microcomputer 77, and the displaying unit 79 is turned on by sending a display SET ON command to the converter circuit 78.

In the example shown in Table I, only four different types of commands are shown. However, it will be clear to one skilled in the art that other types of commands for controlling any type devices by interactive read-out of information may be used, such as, e.g., pause-command for causing a pause in the playback, a mute command for causing muting of the video and/or audio output, and/or a play command for causing a start of the read out of the information.

The menu information is stored in the R-W channels of the subcode channel in formats as shown in FIGS. 5A–5D and 6A–6D, and preferably is also made visible before starting the playback of the program on the information carrier 70. When the information carrier is a CD or CDV-disc, the menu information may be preferably recorded before the beginning of the first information track, in the R-W channels of the track pre-pause (track 01 under 00) between the end of the lead-in track and the beginning of the first information track. When the menu information is stored before the first information track, the menu information can be retrieved and loaded in the menu memory 82 before starting the playback by means of the above-mentioned Jump Command being executed directly after reading the TOC from the CD-subcode lead-in area. For loading the menu information into the menu memory 82, the microcomputer 77 is programmed for detecting the index codes in the packets of the selected main category and storing the menu text lines and the corresponding command codes in the addresses indicated by the index code.

Menu text lines and command codes with a predetermined index code, e.g. 00, are not stored in he menu memory 82. The command codes with this index codes are directly executed. This allows the executions of a number of commands before the menu information is loaded in the menu memory 82, e.g., commands for setting the main and sub-category, initiate the search and reading of the locations in which the menu information is stored with subsequent display of, e.g., a menu or a picture, and displaying a menu after the read-in of the menu information.

Figure 8:
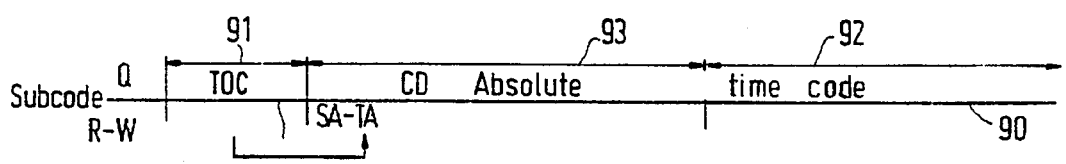
FIG. 8 shows a lay-out of an information track of an information carrier according to the invention.

FIG. 8 shows the locations in which start-up information may preferably be stored in the R-W channels of the sub-code channel of a CD or CDV-disc. Reference 90 indicates a track in which a CD-signal has been recorded. At the beginning of the tracks, a lead-in track 91, in which a Table of Contents (TOC) has been recorded in the Q-channel of the subcode channel, exists. The first information track, with audio information, (track 1/index 1) is indicated by reference 92. Between the load-in track 91 and the first information track 92, a pre-pause track (track 1/index 0), indicated by reference 93, is situated. In the part of the track 90 situated after the lead-in track 91 (i.e., in the pre-pause track 93), an absolute time code indicating an information position (address) is recorded in the Q-channel. In the R-W channels of the lead-in track 91, a Jump Command code, including an address TA indicating the beginning of the recording of the start-up information, e.g., menu information in the R-W channel in the prepause track 93, is recorded. A safety distance SA between the end of the Table of Contents and the beginning of the menu information is indicated. The R-W channels in the first information track (track 1/index 1) may comprise further menu information.

When starting the read-out of the track 90, the Table of Contents and the Jump Command code including the address TA are read from the Q and R-W channels, respectively, first. After read-in of the Table of Contents has been completed, the Jump Command (to the address TA) is executed and the menu information is read-out and stored in the menu memory 82.

The use of command codes which are directly executed after retrieval allows a pause function, after loading the menu information and displaying a menu or picture, to be invoked. In using the directly executed command codes, it is also possible to start with the read-out of one of the information tracks without displaying menus.

The length of the prepause track 92 corresponds with a playing time of about 2–3 second. This means that above 200 menu text lines can be stored in the prepause track 93. However, if more menu text lines are to be read in, further menu information can be recorded in the R-W channels in parallel to any part of the main information program. In that case, it is preferred to mute the output of audio and video information during the retrieval of such information from the R-W channels via a mute command recorded in the prepause track 93 for muting the output audio information and video information during the reading of track 92.

Besides a simple and powerful interactive control of CD-players and CDV players, the formats of the R-W channels described above allows a fast display of additional textual information about the audio or video information recorded in the information carrier itself.

The use of different information categories allows textual information in different languages to be recorded in packets having different main category codes, so that each user can select the language with which he or she is familiar. The use of the different sub-information categories allows a simple selection of the type of information to be displayed. Since the packets of different categories are interleaved, and the data transfer rate for the information recorded in the R-W subcode signals is high (75 packets per second), the selected type of information in the desired language will be available fast. This high data rate has the advantage that the information in the packets can be repeated several times without perceptibly reducing the access time to the information.

The program of transferring the information via the R-W channels is particularly advantageous for the 5-inch CDV disc on which about 20 minutes audio information and 6 minutes video information has been recorded. In a time interval in which only the audio information is reproduced, information recorded in the R-W channels can be displayed. A further advantage of the system is the use of the R-W channels for information transfer. These channels are not commonly used in the present CD audio and CDV discs. This means that the CD audio and CDV disc with information recorded in the R-W channels can be read without causing problems with the prior art CD and CDV disc players.

The arrangement shown in FIG. 7 may be extended by a 2-line LCD display 79a which can be controlled by the microcomputer 77 via a control circuit 78a of a usual type in order to display the coded text lines with a text position code LCD1, LDC0=01 or 10 indicating the first or second line of the 2-line display 79a. As stated before, the text position code LCD0, LCD1=00 is used to indicate that the coded text line is not to be displayed on the 2-line display 79a. The text position code LCD1, LCD1=11 force a scroll-up of the information displayed on the 2-line display 79a, before a new coded text line is displayed on the lower line.

The arrangement shown in FIG. 7 may be further extended by a second menu memory 82a of a read-only type, in which menu text lines and corresponding commands are permanently stored in order to enable hardware dependent control of the arrangement, such as, e.g. setting the output level of the audio signal, setting the video displaying system or controlling additional devices such as a tuner, a video recorder etc.

In order to enable a switching from the menu memory 82 to the menu memory 82a and visa versa, in each of the menu memories a selectable command code is stored for changing the menu memory used, or a control key is provided for the same purpose. The use of the two menu memories in which the menu information is stored in the same format has the advantage that the controlling of the hardware dependent functions of the arrangement and the interactive retrieval of the information recorded on the information carrier can be done by the user in the same way. This provides a very user friendly user interface.

Figure 9:
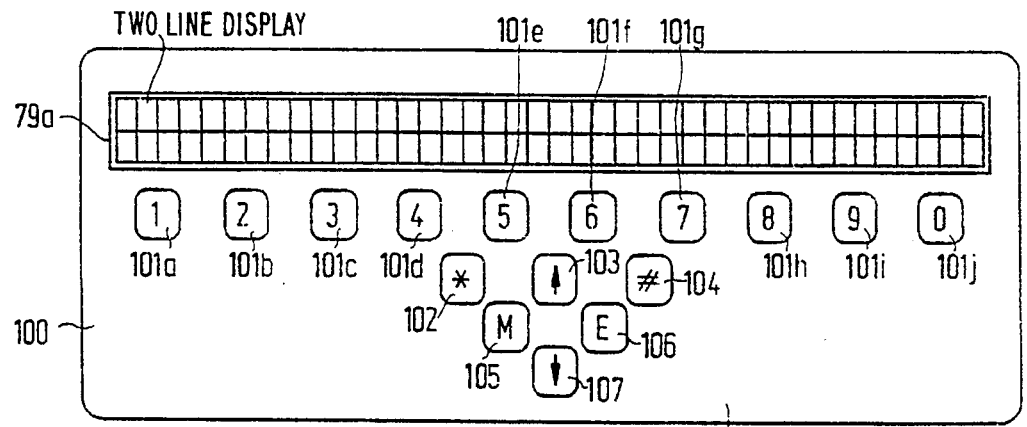
FIG. 9 shows a remote controller for use in the arrangement according to the invention.

FIG. 9 shows an embodiment of a remote controller 100 for use with the arrangement shown in FIG. 7. The remote controller includes the 2-line display 79a and the menu selection unit 83a of the arrangement of FIG. 7. The keys of the menu selection unit 83 are indicated by references 101a, . . . , 101j (hereinafter the "keys 101") and 102–107. Key 105 is a key for invoking the display of a menu when the display has been set in the display switch off mode. When a menu is already displayed, pressing the key 105 causes the previous menu to be displayed. The keys 103 and 104 are used for cursor control in order to move a cursor displayed on the display 79a or 79 upwards or downwards. The arrangement of FIG. 7 is provided with means of the usual type for forcing a scroll-up or a scroll-down of the information displayed, if the cursor has reached the upper or lower text line displayed.

The key 106 is used as an "ENTER" key for terminating an instruction inserted via the other keys. The keys 101 may be used for selecting menu items from text lines, which are, e.g., indicated by a number in the displayed menu or physically combined with the keys 101. When the keys 101 are used for this selection function, it may be preferably to display on the 21-line display (i.e. displaying unit 79) the complete menu and on the 2-line display 79a an indication of the function of the keys 101 directly above each key, irrespective of the cursor position. It may also be advantageous to load the computer 77 with a program for directly inputting the index address of a command code via the remote controller 100. The input of the address can be done by pressing key 104 in order to indicate that an address together with a corresponding main and sub-category codes for directly addressing a command code is to be inserted and inputting the address by means of the keys 101. After the direct input of the address code, the command represented by the addressed command code is executed. The above may be a problem, however, because the user normally does not know the index addresses of the command codes. In order to overcome this problem, the microcomputer 77 may be provided with a program for displaying the address of a selected menu line or item, and thus the address of the corresponding command code. By means of pressing key 104 during at least a predetermined time interval, e.g., longer than two seconds, it can be indicated by the user that a display of the address of the selected menu text line is wanted.

In the above embodiment, the present invention has been applied to a CD disc. However the present invention can be applied to other information recording system such as digital audio tape recording systems.

Finally, it is noted that in the above-described embodiment, only coded text lines and command codes are transferred or discussed. Nevertheless, it may be possible to record other information in the packets, such as, e.g., compressed picture information, object codes, synthetic speech, etc.

I claim:

1. A system for transferring information, comprising:

an information carrier having main information and sub-information, the sub-information including a plurality of information packets which each contains coded text or image information therein relating to an information category and a category code which is separate from and indicates the information category to which the information contained therein relates, different ones of the information packets containing coded text or image information relating to different information categories and being interleaved; and an arrangement for reading the information carrier, including:

reading means for reading the sub-information;

selection means for selecting one of the information categories to which the information contained in the information packets relates as a selected information category; and separating means for separating the one or more information packets containing coded text or image information relating to the selected information category from the sub-information on the basis of the category codes.

2. The system as claimed in claim 1, wherein the information category to which the information contained in each information packet relates is a main category to which the information contained therein relates, or a combination of a main category and a sub-category to which the information contained therein relates.

3. The system as claimed in claim 1, wherein said separating means (a) includes detection means for detecting which of the information packets contain a category code which corresponds with the selected information category and (b) separates the one or more information packets containing a category code which corresponds with the selected information category from the sub-information.

4. The system as claimed in claim 3, wherein one of the category codes contained in the information packets is an override category code which overrides the selected information category thereby causing said separating means to also separate from the sub-information the one or more information packets which contain the override category code, irrespective of the selected information category.

5. The system as claimed in claim 1, wherein each of the information packets contains a main category code indicating a main category to which the information contained therein relates and a sub-category code indicating a sub-category to which the information contained therein relates, which main category code and sub-category code together constitute the category code included therein and which main category and sub-category together correspond to the information category to which the information contained therein relates, different ones of the information packets containing different main category codes and different ones of the information packets containing different sub-category codes; said selection means selects one of main categories to which the information contained in the information packets relates as a selected main category and one of the sub-categories to which the information contained in the information packets relates as a selected sub-category; and said separating means (a) includes detection means for detecting which of the information packets contain both a main category code and a sub-category code which correspond with the selected main category and the selected sub-category, respectively, and (b) separates the one or more information packets containing both a main category code and a sub-category code which correspond with the selected main category and the selected sub-category, respectively, from the sub-information.

6. The system as claimed in claim 5, wherein one of the main category codes contained in the information packets is an override main category code which overrides the selected main category thereby causing said separating means to also separate from the sub-information the one or more information packets which contain both the override main category code, irrespective of the selected main category, and a sub-category code which corresponds with the selected sub-category.

7. The system as claimed in claim 5, wherein one of the sub-category codes contained in the information packets is an override sub-category code which overrides the selected sub-category thereby causing said separating means to also separate from the sub-information the one or more information packets which contain both a main category code which corresponds with the selected main category and the override sub-category code, irrespective of the selected sub-category.

8. The system as claimed in claim 5, wherein one of the main category codes contained in the information packets is an override main category code which overrides the selected main category and one of the sub-category codes contained in the information packets is an override sub-category code which overrides the selected sub-category such that said separating means also separates from the sub-information (a) the one or more information packets which contain both the override main category code, irrespective of the selected main category, and a sub-category code which corresponds with the selected sub-category, (b) the one or more information packets which contain both a main category code which corresponds with the selected main category and the override sub-category code, irrespective of the selected sub-category, and (c) the one or more information packets which contain both the override main category code and the override sub-category code, irrespective of the main category and the sub-category.

9. The system as claimed in claim 1, wherein the information packets further contain control codes.

10. The system as claimed in claim 9, wherein the control codes include position codes indicating at which positions on a display the coded text or image information contained in the information packets is to be displayed.

11. The system as claimed in claim 10, wherein the position codes indicate positions on at least two displays, each having a different number of display lines, in which the coded text or image information contained in the information packets is to be displayed.

12. The system as claimed in claim 1, wherein the sub-information further includes a plurality of additional information packets which contain command codes.

13. The system as claimed in claim 12, wherein the command codes include a control command code for controlling a device.

14. The system as claimed in claim 13, wherein the command codes include a display switch on code and a display switch off code for switching on and off, respectively, a display device which displays information included in the information carrier.

15. The system as claimed in claim 12, wherein the command codes include a selection code for selecting one of the information categories to which the information contained in the information packets relates.

16. The system as claimed in claim 12, wherein the information carrier is provided with address information indicating addresses of the main information, and the command codes include a Jump Command code for causing the system to initiate a search to locate a portion of the main information having an address indicated by the Jump Command code.

17. The system as claimed in claim 12, wherein the command codes contained in the additional information packets relate to the information categories to which the information contained in the information packets relates; and said separating means also separates the one or more additional information packets containing command codes relating to the selected information category from the sub-information.

18. The system as claimed in claim 17, wherein the information packets and the additional information packets are transferred via the R to W sub-code channels of a CD signal recorded on the information carrier.

19. The system as claimed in claim 12, wherein the information packets contain coded menu text items forming one or more menus and the additional information packets contain command codes corresponding to the coded menu text items; and the system further comprises a menu memory, means for loading the coded menu text items and the command codes corresponding thereto in said menu memory, means for displaying coded menu text items stored in said menu memory and forming a menu, means for selecting one of the coded menu text items being displayed and means for supplying a command code stored in said menu memory and corresponding to the coded menu text items selected as a control code to a device.

20. The system as claimed in claim 19, wherein the command codes include one or more menu address codes for initiating the display of another menu made up of one or more coded menu text items stored in said menu memory at one or more addresses indicated by the one or more menu address codes.

21. The system as claimed in claim 19, wherein the information packets and the additional information packets include an index code indicating addresses within said menu memory in which the coded menu text items and the command codes corresponding thereto are to be stored.

22. The system as claimed in claim 19, wherein the command codes contained in the additional information packets relate to the information categories to which the information contained in the information packets relates; said separating means also separates the one or more additional information packets containing command codes relating to the selected information category from the sub-information; and the coded menu text items and the command codes corresponding thereto which are loaded into said menu memory relate to the selected information category and are included in information packets and additional information packets, respectively, which are separated from the sub-information by said separating means.

23. The system as claimed in claim 1, wherein a group of the information packets which each contains information relating to the same information category forms a packet group, and the first information packet in the packet group includes a start code which indicates if separation of the information packets of the group can begin when the information included in each of the information packets of the packet group relates to the selected information category.

24. The system as claimed in claim 1, further comprising outputing means for outputting the coded text or image information contained in the information packets which are separated to a display device for displaying that information.

25. The system as claimed in claim 1, wherein the information packets are transferred via the R to W sub-code channels of a CD signal recorded on the information carrier.

26. The system as claimed in claim 1, wherein the information carrier is a CD or a CDV disc with a Table of Contents included in a lead-in track preceding main information tracks in which the main information is included, and the lead-in track includes a Jump Command code indicating a track address to which said reading means is intended to jump, the Jump Command code being included in the R to W sub-code channels.

27. The system as claimed in claim 26, wherein the track address is a location within a prepause of one of the main information tracks at which one or more of the information packets is included.

28. The system as claimed in claim 27, wherein the prepause is in the first one of the main information tracks.

29. A system for transferring information, comprising:
an information carrier having main information and sub-information related to the main information, the sub-information including a plurality of information packets which each contains coded text or image information therein and a category code which is separate from and includes an information category to which the information contained in that information packet relates, at least two of the information packets each having a different category code corresponding to a different information category;
reading means for reading the sub-information from the information carrier; and
separating means for separating one or more of the information packets from the sub-information on the basis of the category codes, said separating means separating the one or more information packets which contain a category code corresponding to a selected one of the information categories to which the information contained in the information packets relates.

30. An arrangement for reading an information carrier having main information and sub-information, the sub-information including a plurality of information packets which each contains coded text or image information therein relating to an information category and a category code which is separate from and indicates the information category to which the information contained therein relates, different ones of the information packets containing coded text or image information relating to different information categories and being interleaved, the arrangement comprising:

reading means for reading the sub-information;
selection means for selecting one of the information categories to which the information contained in the information packets relates as a selected information category; and
separating means for separating the one or more information packets containing coded text or image information relating to the selected information category from the sub-information on the basis of the category codes.

31. The arrangement as claimed in claim 30, wherein said separating means (a) includes detection means for detecting which of the information packets contain a category code which corresponds with the selected information category and (b) separates the one or more information packets containing a category code which corresponds with the selected information category from the sub-information.

32. The arrangement as claimed in claim 31, wherein the information category to which the information contained in each information packet relates is a main category to which the information contained therein relates, or a combination of a main category and sub-category to which the information contained therein relates.

33. The arrangement as claimed in claim 31, wherein said detection means further detects which of the information packets contain an override category code for overriding the selected information category, and said separating means also separates the one or more information packets containing the override category code, irrespective of the selected information category, from the sub-information.

34. The arrangement as claimed in claim 30, wherein each of the information packets contains a main category code indicating a main category to which the information contained therein relates and a sub-category code indicating a sub-category to which the information contained therein relates, which main category code and sub-category code together constitute the category code included therein and which main category and sub-category together correspond to the information category to which the information contained therein relates, different ones of the information packets containing different main category codes and different ones of the information packets containing different sub-category codes; said selection means selects one of the main categories to which the information contained in the information packets relates as a selected main category and one of the sub-categories to which the information contained in the information packets relates as a selected sub-category; and said separating means (a) includes detection means for detecting which of the information packets contain both a main category code which corresponds with the selected main category code and a sub-category code which corresponds with the selected sub-category and (b) separates the one or more information packets containing both a main category code which corresponds with the selected main category and a sub-category code which corresponds with the selected sub-category from the sub-information.

35. The arrangement as claimed in claim 34, wherein said detection means further detects which of the information packets contain both an override main category code for overriding the selected main category and a sub-category code which corresponds with the selected sub-category, and said separating means also separates the one or more information packets containing both the override main category code, irrespective of the selected main category, and a sub-category code which corresponds with the selected sub-category from the sub-information.

36. The arrangement as claimed in claim 34, wherein said detection means further detects which of the information packets contain both a main category code which corresponds with the selected main category and an override sub-category code for overriding the selected sub-category, and said separating means also separates the one or more information packets containing both a main category code which corresponds with the selected main category and the override sub-category code, irrespective of the selected sub-category, from the sub-information.

37. The arrangement as claimed in claim 34, wherein said detection means further detects (a) which of the information packets contain both an override main category code for overriding the selected main category and a sub-category code which corresponds with the selected sub-category, (b) which of the information packets contain both a main category code which corresponds with the selected main category and an override sub-category code for overriding the selected sub-category and (c) which of the information packets contain both the override main category code and the override sub-category code; and said separating means also separates (a) the one or more information packets containing both the override main category code, irrespective of the selected main category, and a sub-category code which corresponds with the selected sub-category, (b) the one or more information packets containing both a main category code which corresponds with the selected main category and the override sub-category code, irrespective of the selected sub-category, and (c) the one or more information packets containing both the override main category code and the override sub-category code, irrespective of the selected main category and the selected sub-category, from the sub-information.

38. The arrangement as claimed in claim 30, further comprising at least one display device for displaying the coded text or image information included in the information packets which have been separated.

39. The arrangement as claimed in claim 38, further comprising means for positioning the coded text or image information included in the information packets which have been separated at positions on a display of said display device on the basis of position codes included in the information packets which have been separated.

40. The arrangement as claimed in claim 38, wherein the arrangement comprises at least two display devices for displaying the coded text or image information included in the information packets which have been separated.

41. The arrangement as claimed in claim 40, further comprising means for positioning the coded text or image information included in the information packets which have been separated at positions on displays of said at least two display devices on the basis of position codes included in the information packets which have been separated.

42. The arrangement as claimed in claim 30, wherein the sub-information further includes a plurality of additional information packets which contain command codes, and the command codes contained in the additional information packets relate to the information categories to which the information contained in the information packets relates; and said separating means also separates the one or more additional information packets containing command codes relating to the selected information category from the sub-information.

43. The arrangement as claimed in claim 42, further comprising a controllable device which is controlled on the basis of one or more of the command codes included in the additional information packets which have been separated.

44. The arrangement as claimed in claim 43, wherein said controllable device is a display device for displaying the coded text or image information included in the information packets which have been separated, and the arrangement further comprises means for switching said display device on or off on the basis of the one or more command codes included in the additional information packets which have been separated.

45. The arrangement as claimed in claim 42, wherein said selection means selects a new selected information category on the basis of one or more of the command codes included in the additional information packets which have been separated.

46. The arrangement as claimed in 42, wherein said reading means includes search means for searching for an address location on the information carrier in which a portion of the main information is included, and means for controlling said search means to jump to an address location on the information carrier indicated by one or more of the command codes included in the additional information packets which have been separated.

47. The arrangement as claimed in claim 42, wherein the information packets which have been separated include coded menu text items and the additional information packets which have been separated include command codes corresponding to the coded menu text items, and the arrangement further comprises a menu memory for loading the coded menu text items and the corresponding command codes therein.

48. The arrangement as claimed in claim 47, further comprising a control device which controls the arrangement, a display device for displaying the coded menu text items, means for supplying the coded menu text items stored in said menu memory to said display device, means for selecting one of the coded menu text items displayed by said display device, and means for supplying a command coded stored in said menu memory and corresponding to the coded menu text item selected to said control device to control said control device.

49. The arrangement as claimed in claim 48, further comprising a manually activated input means for directly invoking a command code stored in said menu memory.

50. The arrangement as claimed in claim 49, further comprising a second manually input means for retrieving a address in said menu memory at which the coded menu text item which is selected is stored.

51. The arrangement as claimed in claim 42, wherein the information packets which have been separated include coded menu text items and the additional information packets which have been separated include command codes corresponding to the coded menu text items; and the arrangement further comprises a first menu memory and a second menu memory for loading the coded menu text items and the corresponding command codes therein, and selection means for selecting from which of the menu memories coded menu text items stored therein will be displayed.

52. The arrangement as claimed in claim 30, wherein said separating means begins separating the information packets containing coded text or image information relating to the selected information category from the sub-information in response to a start code indicating the start of a group of information packets each containing coded text or image information relating to the selected information category.

53. The arrangement as claimed in claim 30, further comprising outputting means for outputting the coded text or image information contained in the information packets which are separated to a display device for displaying that information.

54. An arrangement for reading an information carrier having main information and sub-information related to the main information, the sub-information including a plurality of information packets which each contains coded text or image information therein and a category code which is separate from and indicates an information category to which the information contained in that information packet relates, at least two of the information packets each having a different category code corresponding to a different information category, the arrangement comprising:

reading means for reading the sub-information from the information carrier; and separating means for separating one or more of the information packets from the sub-information on the basis of the category codes, said separating means separating the one or more information packets which contain a category code corresponding to a selected one of the information categories to which the information contained in the information packets relates.

55. An information carrier having main information and sub-information, the sub-information including a plurality of information packets which each contains coded text or image information therein, a main category code indicating a main category to which the information contained in that information packet relates and a sub-category code indicating a sub-category of the main category to which the information contained in that information packet relates, different ones of the information packets having different main category codes corresponding to different main categories and being interleaved.

56. The information carrier as claimed in claim 55, wherein one of the main category codes in the information packets is an override main category code which will causes a device which selects certain of the information packets to be separated from the sub-information on the basis of a selected main category code, which is a different one of the main category codes included in the information packets than the override main category code, to treat the one or more information packets which contain the override main category code as though they contain the selected main category code, irrespective of the selected main category code.

57. The information carrier as claimed in claim 55, wherein different ones of the information packets have different sub-category codes corresponding to different sub-categories, and one of the sub-category codes in the information packets is an override sub-category code which will causes a device which selects certain of the information packets to be separated from the sub-information on the basis of a selected sub-category code, which is a different one of the sub-category codes included in the information packets than the override sub-category code, to treat the one or more information packets which contain the override sub-category code as though they contain the selected sub-category code, irrespective of the selected sub-category code.

58. The information carrier claimed in claim 55, wherein the information packets further contain control codes.

59. The information carrier as claimed in claim 58, wherein the control codes include position codes indicating at which positions on a display the coded text or image information is to be displayed.

60. The information carrier as claimed in claim 59, wherein the position codes indicate positions on at least two displays, each having a different number of display lines, in which the coded text or image information is to be displayed.

61. The information carrier as claimed in claim 55, wherein the sub-information further includes an additional information packet which contains a command code for controlling a device.

62. The information carrier as claimed in claim 55, wherein the sub-information further includes a plurality of additional information packets which contain command codes.

63. The information carrier as claimed in claim 62, wherein the command codes include a control command code for controlling a device.

64. The information carrier as claimed in claim 63, wherein the command codes include a display switch on code and a display switch off code for switching on and off, respectively, a display device which displays the coded text or image information included in the information carrier.

65. The information carrier as claimed in claim 62, wherein the command codes include a selection code for selecting one of the main categories to which the information contained in the information packets relates for indicating that the one or more information packets containing the information relating to the main category selected are to be separated from rest of the sub-information.

66. The information carrier as claimed in claim 62, wherein the command codes include one or more selection codes for selecting one of the main categories to which the information contained in the information packets relates and one of the sub-categories to which the information contained in the information packets relates for indicating that the one or more information packets containing the information relating to both the main category selected and the sub-category selected are to be separated from rest of the sub-information.

67. The information carrier as claimed in claim 62, wherein the information carrier is provided with address information indicating addresses of the main information, and the command codes include a Jump Command code for initiating a search to locate a portion of the main information having an address indicated by the Jump Command code.

68. The information carrier as claimed in claim 62, wherein the information packets contain coded menu text items and the additional information packets contain command codes corresponding to the coded menu text items.

69. The information carrier as claimed in claim 68, wherein the command codes include a menu address code for initiating a display of a menu made up of one or more coded menu text items to be stored in a menu memory at one or more addresses indicated by the menu address code.

70. The information carrier as claimed in claim 68, wherein the information packets and the additional information packets include an index code indicating addresses at which the coded menu text items and the command codes corresponding thereto are to be stored in a menu memory.

71. The information carrier as claimed in claim 62, wherein the command codes contained in the additional information packets relate to the information categories to which the information contained in the information packets relates.

72. The information carrier as claimed in claim 55, wherein a group of the information packets which each contains information relating to the same main information category and the same sub-information category form a packet group, and the packet group includes a start code indicating the start of the packet group.

73. The information carrier as claimed in claim 72, wherein the start code further indicates that separation of the information packets of the group from the sub-information, if desired, can begin.

74. The information carrier as claimed in claim 72, wherein the start code is included in the first information packet of the packet group.

75. The information carrier as claimed in claim 55, wherein the information packets are included in the R to W sub-code channels of a CD signal recorded on the information carrier.

76. The information carrier as claimed in claim 55, wherein the information carrier is a CD or a CDV disc with a Table of Contents included in a lead-in track preceding main information tracks in which the main information is included, and the lead-in track includes a Jump Command code in the R to W sub-code channels indicating a track address to which a jump is to be performed by a reading device.

77. The information carrier as claimed in claim 76, wherein the track address is a location within a prepause of one of the main information tracks at which one or more of the information packets is included.

78. The information carrier as claimed in claim 77, wherein the prepause is in the first one of the main information tracks.

79. The information carrier as claimed in claim 55, wherein information packets containing the same information are repeated successively in the sub-information.

80. The information carrier as claimed in claim 55, wherein the main category code and the sub-category code included in each information packet is separate from the information included therein.

81. An arrangement for reading an information carrier having a plurality of information packets which each contains coded information therein and a category code which is separate from and indicates an information category to which the information contained in that information packet relates, at least two of the information packets each having a different category code corresponding to a different information category, the arrangement comprising:

reading means for reading the information packets from the information carrier; and separating means for separating the one or more information packets which contain a category code corresponding to a selected one of the information categories to which the information contained in the information packets relates from the other information packets.

82. The arrangement as claimed in claim 81, further comprising selection means for selecting the selected one of the information categories.

\* \* \* \* \*